United States Patent
Ge et al.

(10) Patent No.: US 10,581,363 B2
(45) Date of Patent: Mar. 3, 2020

(54) ISOLATED DUAL BUS HYBRID VEHICLE DRIVETRAIN

(71) Applicant: Ford Global Technologies, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/016,069

(22) Filed: Jun. 22, 2018

(65) Prior Publication Data

US 2019/0393821 A1    Dec. 26, 2019

(51) Int. Cl.
*H02P 27/08* (2006.01)
*B60R 16/033* (2006.01)
*H02P 9/02* (2006.01)

(52) U.S. Cl.
CPC ............ *H02P 27/08* (2013.01); *B60R 16/033* (2013.01); *H02P 9/02* (2013.01)

(58) Field of Classification Search
CPC ...................................................... H02P 27/08

USPC ...................................................... 318/139, 34
See application file for complete search history.

(56) References Cited

U.S. PATENT DOCUMENTS

| | | | |
|---|---|---|---|
| 5,739,650 A * | 4/1998 | Kimura | H02P 6/08 318/400.07 |
| 6,847,129 B2 * | 1/2005 | McKelvey | F02C 7/26 290/52 |
| 7,495,399 B2 * | 2/2009 | Oyobe | B60L 53/24 318/143 |
| 9,061,595 B2 | 6/2015 | King et al. | |
| 2017/0305298 A1 | 10/2017 | Takeshima et al. | |

* cited by examiner

*Primary Examiner* — David Luo
(74) *Attorney, Agent, or Firm* — David B. Kelley; Brooks Kushman P.C.

(57) ABSTRACT

A powertrain for a vehicle includes a Y-wound generator and Y-wound motor coupled via respective neutral terminals, a generator inverter coupled between the Y-wound generator and a generator bus, and a motor inverter coupled between the Y-wound motor and a motor bus. The powertrain further includes a traction battery having first and second terminals each selectively coupled to the neutral terminals. The second terminal is further coupled to bus terminals of the generator and motor bus.

12 Claims, 10 Drawing Sheets

ISOLATED DUAL BUS HYBRID VEHICLE DRIVETRAIN

TECHNICAL FIELD

This application is generally related to a hybrid vehicle powertrain having dual electric machines each having an isolated DC/AC converter and each operating at independent voltages.

BACKGROUND

Electrified vehicles (EVs) including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120-degree phase separation. The traction battery is configured to operate in a particular voltage range and provide a current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, which may include a traction motor and a generator, may require high voltage and high current. Due to the voltage and current requirements, a battery module and a power electronics module are typically in continuous communication.

SUMMARY

A powertrain for a vehicle includes a Y-wound generator and Y-wound motor coupled via respective neutral terminals, a generator inverter coupled between the Y-wound generator and a generator bus, a motor inverter coupled between the Y-wound motor and a motor bus, and a traction battery having first and second terminals each selectively coupled to the neutral terminals. The second terminal is further coupled to bus terminals of the generator and motor bus. The bus terminals may be negative bus terminals of the generator and motor bus. The powertrain may further include a first switch coupled between the neutral terminals and a negative terminal of the traction battery, and a second switch coupled between the neutral terminals and a positive terminal of the traction battery. The first and second switches may be insulated gate bipolar junction transistors (IGBTs), a collector of the first switch may be coupled with the neutral terminals, an emitter of the first switch may be coupled with the negative terminal, a collector of the second switch may be coupled with the positive terminal, and an emitter of the second switch may be coupled with the neutral terminals. The powertrain may further include a first switch coupled between the neutral terminal of the motor and a negative terminal of the traction battery, and a second switch coupled between the neutral terminal of the motor and a positive terminal of the traction battery. The first and second switches may be insulated gate bipolar junction transistors (IGBTs), a collector of the first switch may be coupled with the neutral terminal of the motor, an emitter of the first switch may be coupled with the negative terminal, an emitter of the second switch may be coupled with the neutral terminal of the motor, and a collector of the second switch may be coupled with the positive terminal. The powertrain may further include a controller configured to modulate switches of the generator inverter and the motor inverter such that voltage levels of the generator bus vary independently of the motor bus. The powertrain may further include a generator bus capacitor and a motor bus capacitor. The generator bus voltage level may be filtered by the generator bus capacitor and a motor bus voltage level may be filtered by the motor bus capacitor. The switches may be insulated gate bipolar junction transistors (IGBTs) or metal oxide semiconductor field effect transistors (MOSFETs). The powertrain may further include a generator controller configured to modulate switches of the generator inverter and a motor controller configured to modulate switches of the motor inverter such that a generator phase frequency is independent of a motor phase frequency.

A powertrain control method includes in a propulsion mode, directing current from a battery to a first neutral terminal of a first electric machine, via a DC-DC converter, and a second neutral terminal of a second electric machine, modulating a first inverter switch to output a first bus voltage, and modulating a second inverter switch to output a second bus voltage that is different from the first bus voltage. The directing current from a battery to the second neutral terminal may be via a second DC-DC converter. The modulating of the first inverter switch may be at a first frequency and the modulating of the second inverter switch may be at a second frequency different than the first frequency.

A vehicle powertrain includes a generator having a first neutral terminal, a motor having a second neutral terminal that is selectively coupled with the first neutral terminal, and a traction battery having a first terminal that is selectively coupled to the first and second neutral terminals. The vehicle powertrain may further include a first switch coupled between the second neutral terminal and a negative terminal of the traction battery, and a second switch coupled between the second neutral terminal and a positive terminal of the traction battery. The first and second switches may be insulated gate bipolar junction transistors (IGBTs), a collector of the first switch may be coupled with the second neutral terminal, an emitter of the first switch may be coupled with the negative terminal, a collector of the second switch may be coupled with the second neutral terminal, and an emitter of the second switch may be coupled with the positive terminal. The vehicle powertrain may further include a first switch coupled between the first and second neutral terminals and a negative terminal of the traction battery, and a second switch coupled between the first and second neutral terminals and a positive terminal of the traction battery. The first and second switches may be insulated gate bipolar junction transistors (IGBTs), a collector of the first switch may be coupled with the first and second neutral terminals, an emitter of the first switch may be coupled with the negative terminal, a collector of the second switch may be coupled with the positive terminal, and an emitter of the second switch may be coupled with the first and second neutral terminals.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A typical drive system for EVs/HEVs may include a direct current (DC) power source (i.e., high-voltage battery), a variable voltage converter (VVC), an inverter and an electric machine. The VVC may be a bi-directional boost converter that is configured to boost a voltage of the battery to an operating voltage of the motor/generator and inverter. A practical aspect of the typical drive system includes, as an increase of power is demanded, multiple power devices connected in parallel may be needed to output higher current/higher power to meet the demand. The connection of multiple power devices in parallel may result in a current sharing problem between the power devices connected in parallel. A result of the current sharing problem is that system efficiency may be compromised. Also, in the typical drive system, an output voltage range of a boost converter may then be limited as the efficiency is decreased when a boost ratio increases, that is High-Voltage DC voltage (Vdc) to the input battery (Vb) (e.g., Vdc/Vb>2). To improve the electric powertrain (e-drive) performance, a VVC that features a wide output voltage range is desired.

Figure 4:
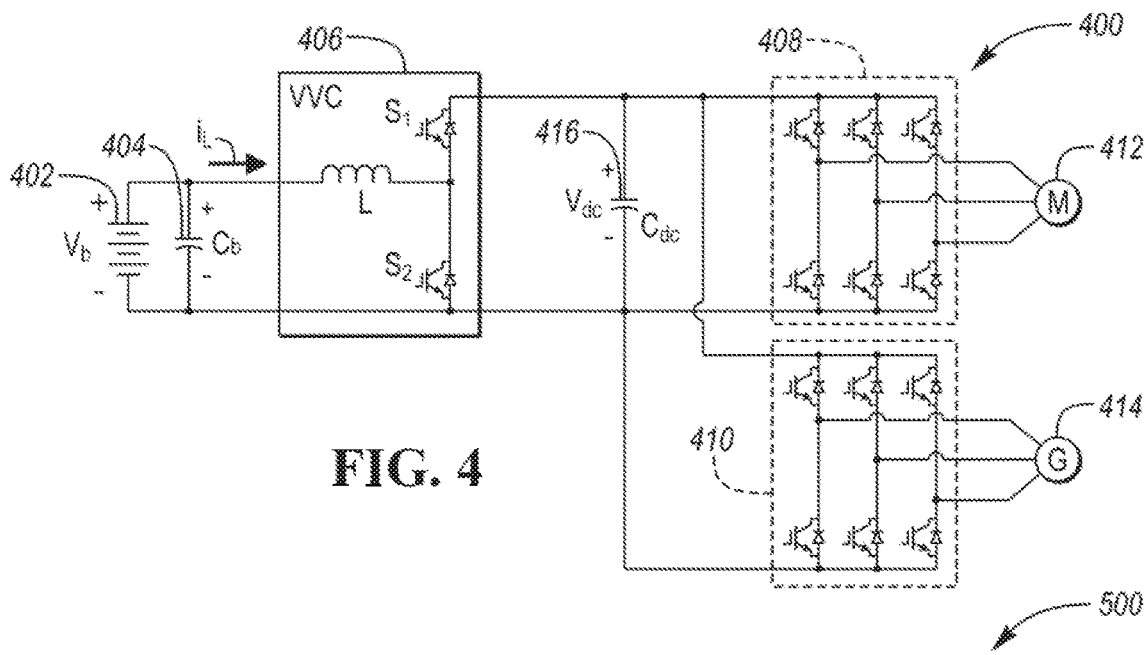
FIG. 4 is a diagram of a hybrid vehicle powertrain including a traction battery, a variable voltage converter, dual inverters, and dual electric machines.

A Hybrid Electric Vehicle (HEV) drive system, includes a traction motor drive, a generator drive, and a variable voltage converter (VVC) as illustrated in FIG. 4. Both Motor and Generator (M/G) can operate in motoring or generating mode, the former operation mode consumes power/energy and the latter operation mode produces power/energy. These three components are coupled via a capacitor based DC bus. In this system, a low voltage of a battery is boosted by the VVC to a high voltage level for enhancing performance of the traction motor drive.

This configuration limits the DC bus voltage such that it cannot be less than battery voltage due to a limitation of VVC topology. In operation, a stator winding voltage of motor/generator is related to rotor speed, wherein a low rotor speed corresponds to a low motor/generator voltage. Thereby setting a minimum DC bus voltage to approximately the battery voltage Vb, a low modulation index is typically used to achieve a low motor/generator stator voltage if motor/generator runs in low speed. As a result, a high DC bus voltage may cause high power loss of motor/generator inverter, and a low modulation index results in high total harmonic distortion (THD) of phase current in motor/generator. If a low DC bus voltage is available, a high modulation index may be used to control motor/generator, thus allowing lower power loss and low phase current THD of motor/generator inverter will be achieved during low-speed operation.

Also, one DC bus is shared by the VVC, motor inverter, and generator inverter. As a result, the same DC bus voltage is applied to both motor inverter and generator inverter. This may result in high power loss of motor/generator inverter when one of them operates in low speed but another one runs in high speed. Generally high-speed operation requires high motor/generator voltage so a high DC bus voltage is preferred, while low speed operation needs a low motor/generator voltage so a low DC bus voltage is preferable. Additionally, a high DC bus voltage and low modulation index used to achieve low speed operation may result in a high THD of the phase current in motor/generator drive.

Here a system is disclosed in which DC bus voltages of motor and generator inverters have a wide range from zero to the designed boost voltage. Wherein the motor and generator inverters have independent DC buses, so each DC bus voltage can be independently varied to meet voltage requirement of motor/generator in different speeds. Their specific DC bus voltages depend on rotor speeds of motor and generator, respectively. For example, if motor runs in high speed but generator operates in low speed, motor and generator inverters will have two DC bus voltages and the motor inverter may operate with a high DC bus voltage, while the generator inverter works with a low DC bus voltage to reduce power loss and to lower phase current THD. Further, as there is no inductor in the proposed E-drive systems, many inductor-related drawbacks are eliminated.

Figure 5:
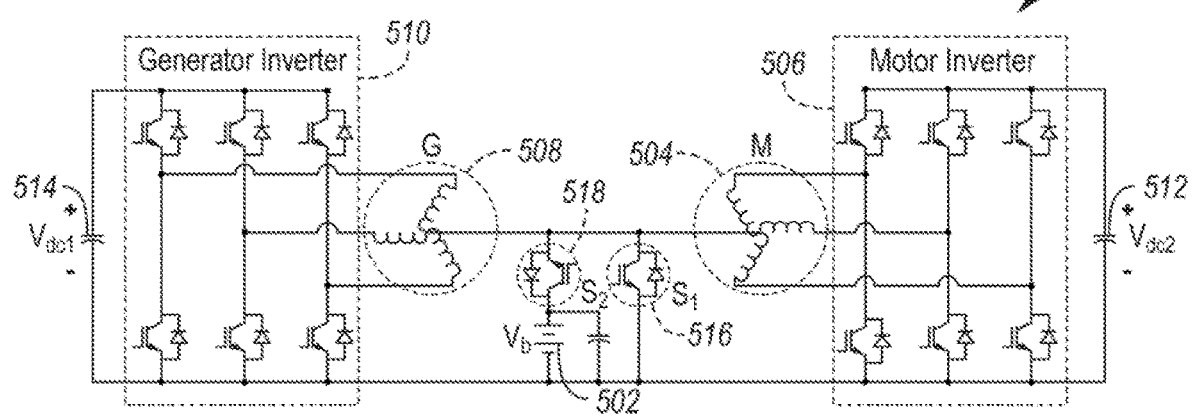
FIG. 5 is a diagram of a dual electric machine powertrain that is powered through each electric machine's neutral terminal by a traction battery.
Figure 7:
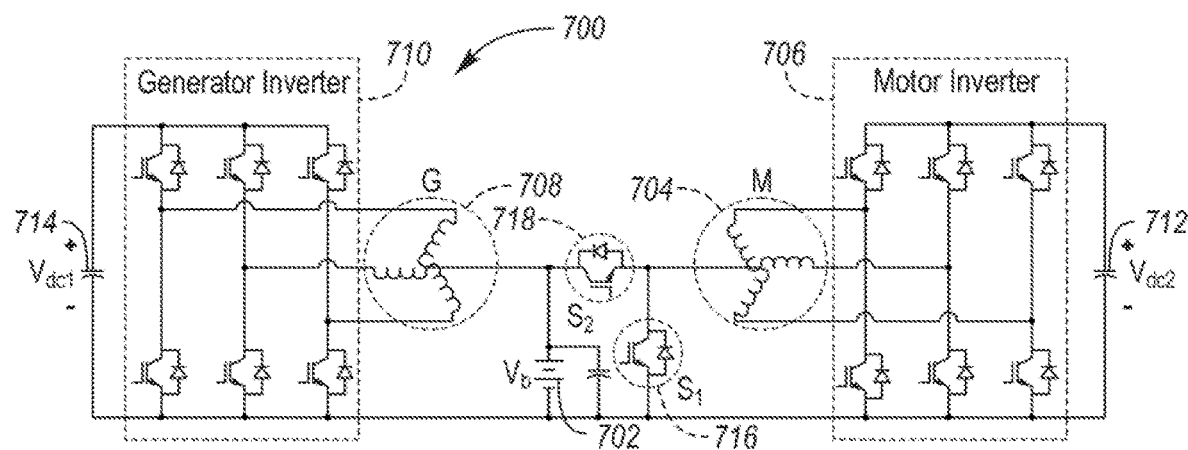
FIG. 7 is a diagram of an embodiment of a dual electric machine powertrain that is powered through each electric machine's neutral terminal by a traction battery.
Figure 8:
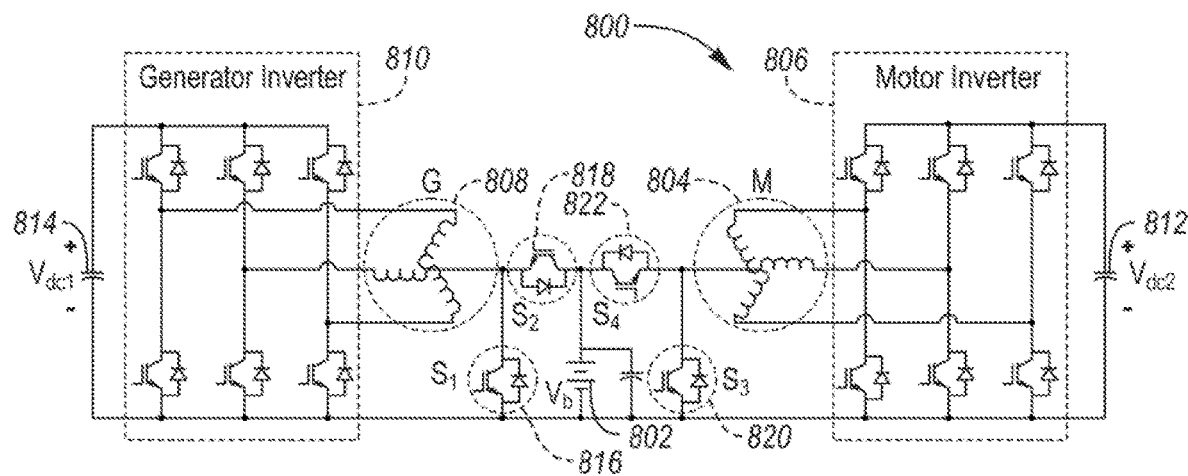
FIG. 8 is a diagram of an embodiment of a dual electric machine powertrain that is powered through each electric machine's neutral terminal by a traction battery.

In the proposed E-drive systems illustrated in FIGS. 5, 7, and 8, a stator winding's neutral points of Generator (G) and Motor (M) are coupled together to form a common neutral point. Wherein the traction battery is connected to the common neutral point via a buck-boost converter. The motor inverter controls motor's operation and controls the DC bus voltage Vdc2 through combination control of the buck-boost converter and inverter. Likewise, the generator inverter controls generator's operation and controls DC bus voltage Vdc1 through combination control of the buck-boost converter and inverter. Both motor and generator can operate in motoring and generating modes, while the traction battery may be in a charging, discharging, non-charging, or non-discharging mode. The DC bus voltages Vdc2 and Vdc1 have wide operational ranges from zero to the desired boost voltage, unlike the DC bus voltage of existing E-drive systems that have a narrow range from battery voltage Vb to the desired boost voltage.

In the proposed systems, two inverters and a buck-boost converter together manage two DC bus voltages and three sources (M, G, and battery), all of them implement bidirectional power flows. Two DC bus voltages Vdc1 and Vdc2 can be independently controlled, such that their independent voltage levels meet operational demands of the motor and generator while operating at different speeds. For example, when the motor e-drive needs a DC bus voltage with a wide range from zero to a desired boost voltage Vdc2 but the generator e-drive just needs a DC bus voltage range from battery voltage Vb to a desired boost voltage Vdc1, the proposed system in FIG. 7 independently controls the converter and the motor inverter to produce voltage Vdc2, and the generator inverter only to achieve voltage Vdc1.

When motor and generator e-drives independently need their own wide voltage ranges which are both from zero to their desired boost voltage levels, one more buck-boost converter may be added on the generator side. Then, motor and generator e-drives each have their own buck-boost converters which make two DC bus voltage controls more flexible, as shown in FIG. 8. The converter with the S1 and S2 controls the DC bus Vdc1, the converter with the S3 and S4 controls the DC bus Vdc2.

Figure 1:
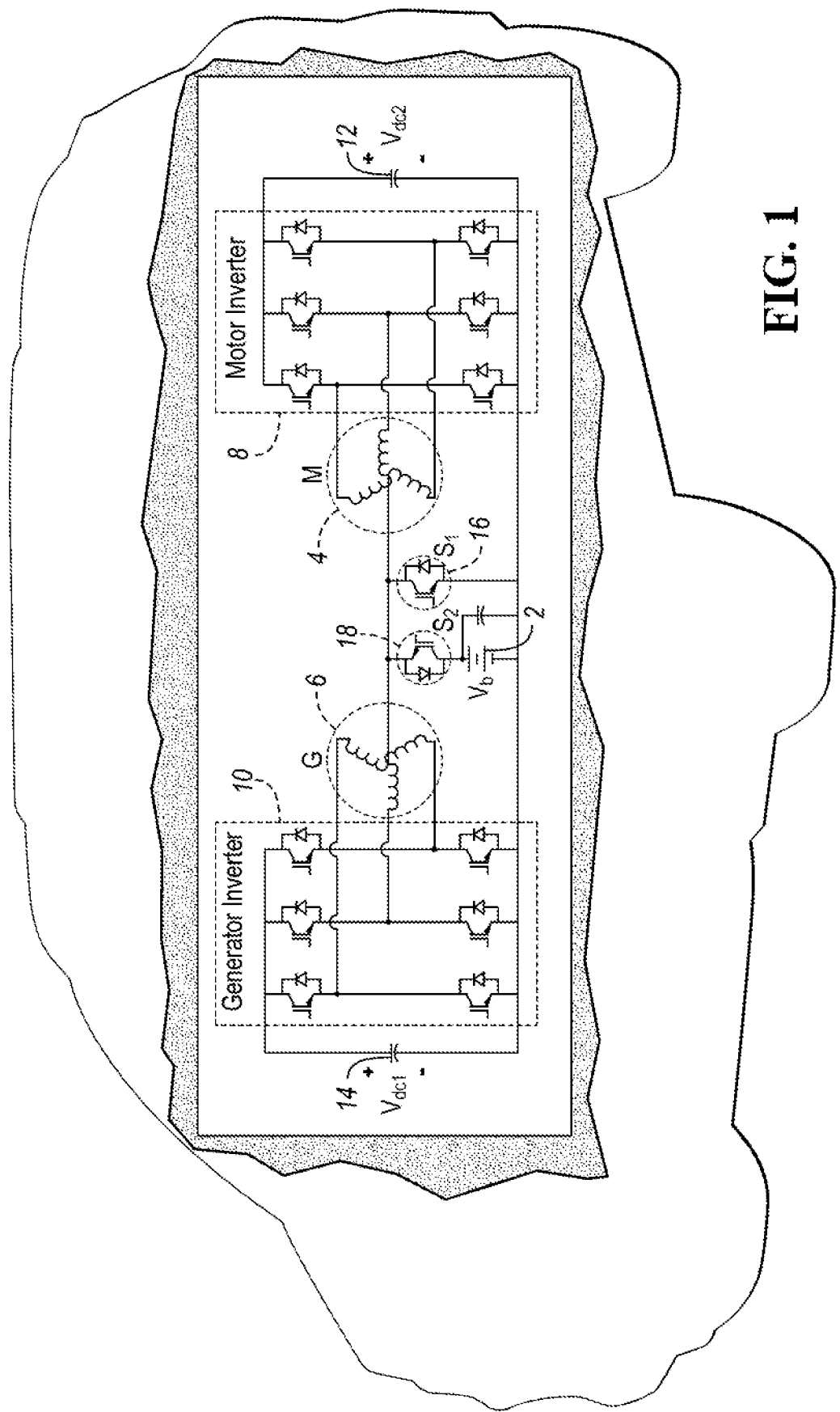
FIG. 1 is a diagram of an electrified vehicle with a dual electric machine powertrain that is selectively powered through each electric machine's neutral terminal by a traction battery.

FIG. 1 depicts a hybrid electric vehicle illustrating internal electric powertrain components configured to flow a current through windings of a motor 4 by operating the motor inverter 8, DC bus 12, and a high voltage traction battery 2, also to flow a current through windings of a generator 6 by operating the generator inverter 10, DC bus 14, and a high voltage traction battery 2. A first switch 16 and second switch 18 are included in the powertrain.

Figure 2:
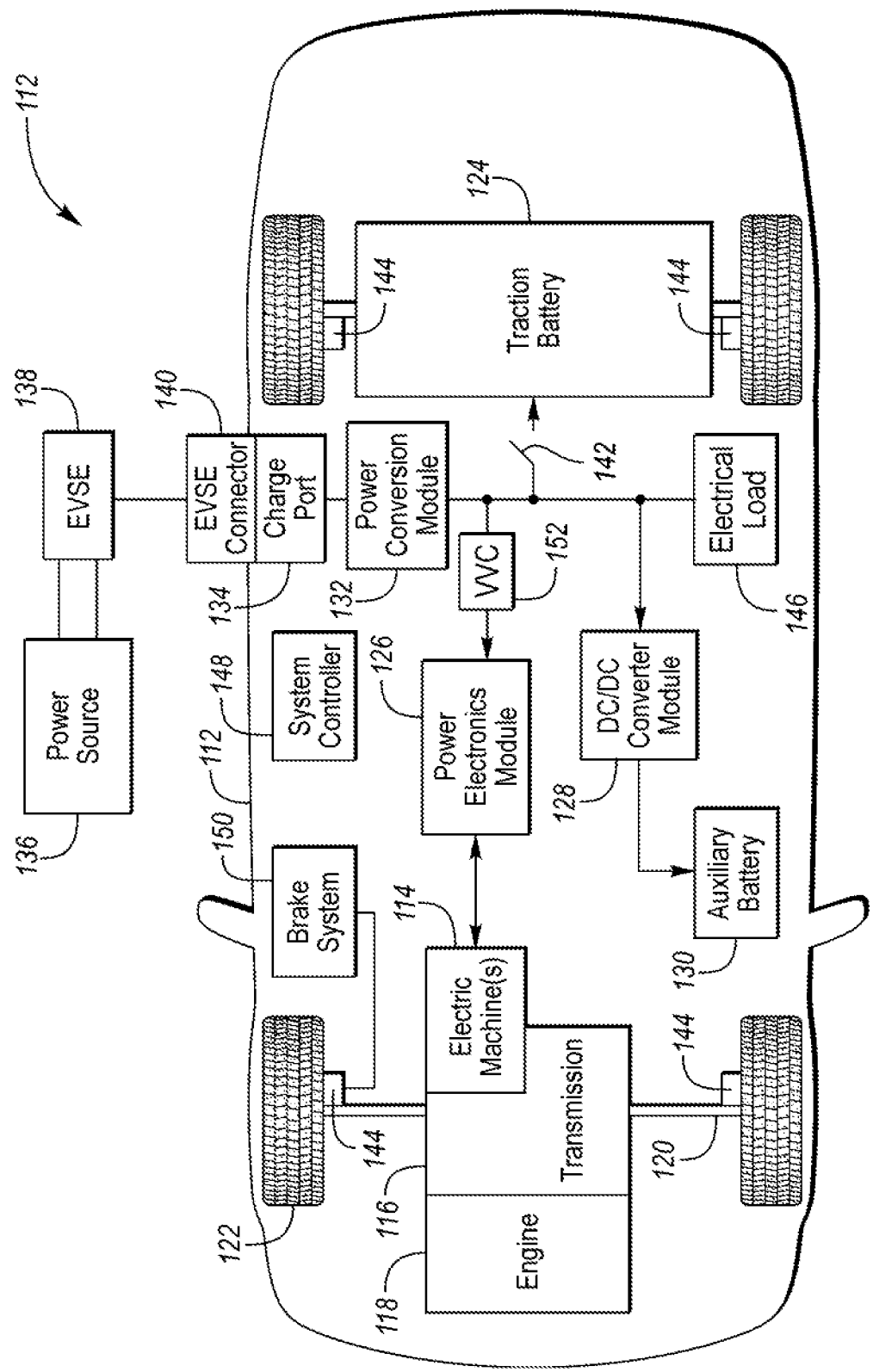
FIG. 2 is a diagram of a hybrid vehicle illustrating typical drivetrain and energy storage components including a variable voltage converter.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V_{dc}^*$. The VVC controller may determine, based on the electrical parameters and the voltage reference, $V_{dc}^*$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel to the traction battery 124. The input capacitor may reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
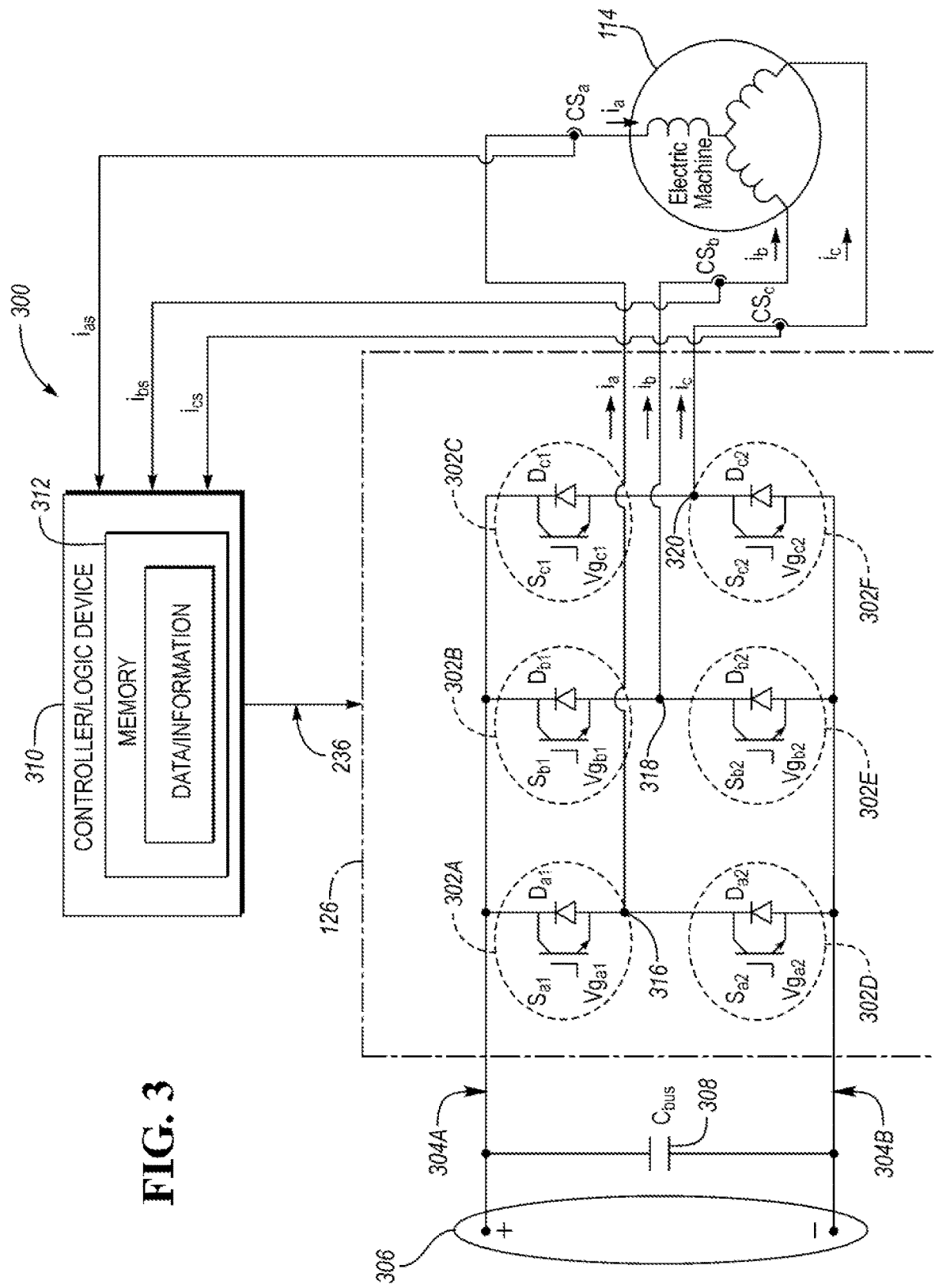
FIG. 3 is a schematic diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and ic to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 236 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 236. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 3: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as Insulated Gate Bipolar Junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

FIG. 4 is a diagram of a hybrid vehicle powertrain 400 including a traction battery 402, an input capacitor 404, a variable voltage converter 406, dual inverters 408 and 410, and dual electric machines 412 and 414. Here, a power split configuration of a Hybrid Electric Vehicle (HEV) drive system is illustrated including a traction motor 412 and traction motor inverter 408, a generator 414 and generator inverter 410, a DC bus capacitor 416, a variable voltage converter (VVC) 406, a battery capacitor 404, and a traction battery 402. Both the motor (M) 412 and generator (G) 414 can operate in propulsion mode or electricity generating mode, the former operation mode converts power/energy into a force, and the latter operating mode converts kinetic energy into electric power/energy. The motor/inverter, generator/inverter and battery are coupled via the capacitor based DC bus, where low voltage of battery is boosted by the VVC to a high level for enhancing performance of the traction motor drive.

This powertrain (E-drive system) as shown in FIG. 4 has advantages and drawbacks. First, a single DC bus is shared by the VVC 406, motor inverter 408, and generator inverter 410 resulting in a single DC bus voltage being applied to both motor inverter 408 and generator inverter 410. Use of a single DC bus voltage may result in an increased power loss in the motor and generator inverters.

Generally, voltages across stator winding within the motor and generator are related to their respective rotor speeds. A high rotor speed typically corresponds to a high motor/generator voltage, while a low rotor speed typically corresponds to a low motor/generator voltage. In some embodiments, the motor and generator may operate at different rotor speeds. For example, one may be operating in high speed mode requiring a high stator voltage, while the other one may be operated in low speed mode with a low stator voltage. With the E-drive system shown in FIG. 4, a high DC bus voltage and a low modulation index are required to achieve a low motor stator voltage if the generator is operating in a high-speed mode while the motor operates in low speed mode. This may result in a high DC bus voltage that causes a high-power loss of motor inverter. Likewise, a high DC bus voltage and a low modulation index are required for the generator inverter/VVC to achieve a low generator stator voltage if motor is operated in a high-speed mode while the generator is operated in a low speed mode. This may result in a high DC bus voltage that causes a high-power loss in the generator inverter. A low modulation index results in high total harmonic distortion (THD) of phase current in motor/generator.

Further, the dual electric machine system 400 typically requires a VVC 406 to ensure a desired DC bus voltage may be generated regardless of a power usage of the motor drive or the generator drive during propulsion or generating. There are some drawbacks to the VVC 406, for example, a VVC is bulky and may be difficult to package in the vehicle, and the VVC 406 has an inductor and power switches that typically have high power losses resulting in low efficiency of the E-drive system. During operation, the inductor may get hot thereby requiring cooling which may be difficult. The combination of additional cooling in a system already difficult to find space for exacerbates the issues and add to the extra cost and weight of the VVC 406. And in some embodiments, the magnetic core of the inductor may have temperature-sensitive performance in which the magnetic core is easily saturated in high temperatures making the VVC performance unstable over some operating conditions.

Here, a dual electric machine system is configured to operate with separate DC buses without a variable voltage converter using a Y-wound motor and a Y-wound generator and flowing power to and from the Y-wound electric machines via the neutral terminal.

FIG. 5 is a diagram of a dual electric machine powertrain 500 that flows power from a battery 502 (e.g., traction battery) to a first electric machine 504 (motor) and motor inverter 506 and a second electric machine 508 (generator) and the generator inverter 510. The battery 502 is coupled with each electric machine's neutral terminal such that power flows to and from the battery 502 from the neutral terminals of the motor 504 and generator 508. The power passes through the inverters and bus storage capacitors. For example, on the motor side, power moves from the battery 502 to the motor 504 through switches $S_1$ 516 and $S_2$ 518, the motor inverter 506 and the motor DC bus capacitor 512, while on the generator side, power moves from the battery 502 to the generator 508 through switches $S_1$ 516 and $S_2$ 518, the generator inverter 510 and the generator DC bus capacitor 514.

The powertrain of FIG. 5 further includes a first switch 516 coupled between the neutral terminal and the negative terminal of the battery 502, and a second switch 518 coupled between the neutral terminal and the positive terminal of the battery 502. The first switch 516 may be a solid-state switch, such as a bipolar junction transistor (BJT), metal oxide semiconductor field effect transistor (MOSFET), or insulated gate bipolar junction transistor (IGBT). In FIG. 5, the first switch 516 is an IGBT and coupled such that the emitter is coupled with the negative terminal of the battery 502 and the collector is coupled with the neutral terminal. The second switch 518 may also be a solid-state switch, such as a bipolar junction transistor (BJT), metal oxide semiconductor field effect transistor (MOSFET), or insulated gate bipolar junction transistor (IGBT). In FIG. 5, the second switch 518 is an IGBT and coupled such that the emitter is coupled with the neutral terminal and the collector is coupled with the positive terminal of the battery 502.

The separate DC bus based E-drive system 500 in a HEV allows for the motor and generator inverters to be separately controlled having their own DC buses. The separate DC busses allow each DC bus voltage to be independently varied to meet the voltage requirements of the electric machines operating at different speeds and possibly in different operating modes. For example, one electric machine may be consuming power while the other may be providing power. This also allows the losses to be controlled, for example, a low DC bus voltage may be applied to provide a low motor/generator stator voltage at low speeds thus reducing the inverter power loss. The separate DC buses aid in a reduction of inverter power loss by overcoming issues of coupled DC bus shown in FIG. 4. For example, if the motor 504 runs at a high speed but the generator 508 operates at a low speed, the motor and generator inverters (506 and 510) will have two DC bus voltages, the motor inverter DC bus is at a high DC bus voltage, and generator inverter DC bus is at a low DC bus voltage to reduce power loss.

As there is no VVC in the E-drive system 500, VVC-related drawbacks list above may be avoided. In the E-drive system 500, the stator winding's neutral points of the generator 508 and motor 504 are coupled together to form a common neutral point. The battery 502 is coupled between the common neutral point and DC bus negative rail through switches 516 and 518. The motor inverter 506 controls the motor's 504 operation and also controls the DC bus voltage Vdc2 at the motor bus capacitor 512 through working with switches 516 and 518. Likewise, generator inverter 510 controls the generator's 508 operation and also controls the DC bus voltage Vdc1 at the generator bus capacitor 514 through working with switches 516 and 518. Both the motor 504 and generator 508 can operate in a propulsion and energy generating mode, the traction battery 502 can be in charging/discharging (or non-charging and non-discharging) mode. Here, the two inverters and two switches manage three sources (the motor 504, the generator 508, and the battery 502), all having bidirectional power flows, and two DC bus voltages Vdc1 at generator bus capacitor 514 and Vdc2 at motor bus capacitor 512 that may be independently controlled having different levels to meet the operational demands of the motor 504 and generator 508 operating at different speeds.

Figure 6:
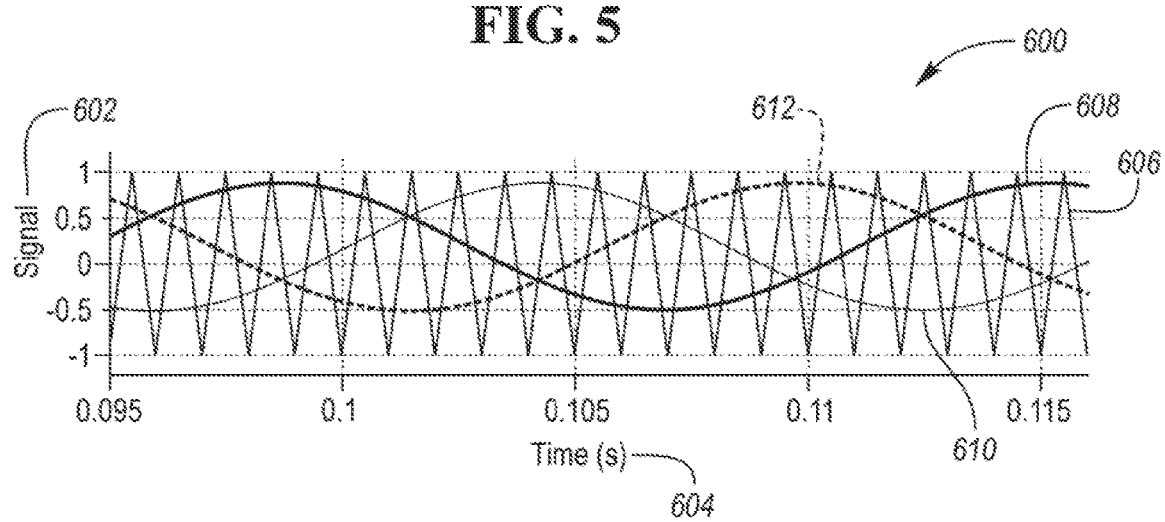
FIG. 6 is a graphical representation of a modulation method to control a dual electric machine powertrain that is powered through each electric machine's neutral terminal by a traction battery.

FIG. 6 is a graphical representation 600 of a modulation method to control a dual electric machine powertrain that is powered through each electric machine's neutral terminal by a traction battery. This modulation method illustrates signal 602 with respect to time 604 in which a carrier signal 606 is super imposed with each phase sinusoidal component having a DC offset (608, 610, and 612). Referring to FIG. 5, the motor and generator inverters (e.g., 506 and 510) may employ the same modulation method 600. The modulation signals that are compared with the carrier in FIG. 6 to control switches of motor/generator inverter (e.g., 506 and 510) include sinusoidal components $m_a$, $m_b$, $m_c$, and DC offset component $D_{bat}$. Here, waveform 608 is $m_a+D_{bat}$, 610 is $m_b+D_{bat}$, and 612 is $m_c+D_{bat}$. The $m_a$, $m_b$, and $m_c$ phase components are used to control line-to-line voltages of motor/generator, the duty cycle $D_{bat}$ controls the DC bus voltage. For the motor inverter (e.g., 506), $D_{bat}=D_M$, $m_a=m_{U1}$, $m_b=m_{V1}$, $m_c=m_{W1}$; for the generator inverter (e.g., 510), $D_{bat}=D_G$, $m_a=m_{U2}$, $m_b=m_{V2}$, $m_c=m_{W2}$.

Here, two carrier waveforms for the motor and generator inverters have substantially a 180° phase shift to achieve interleave control reducing battery current ripple significantly.

Figure 9:
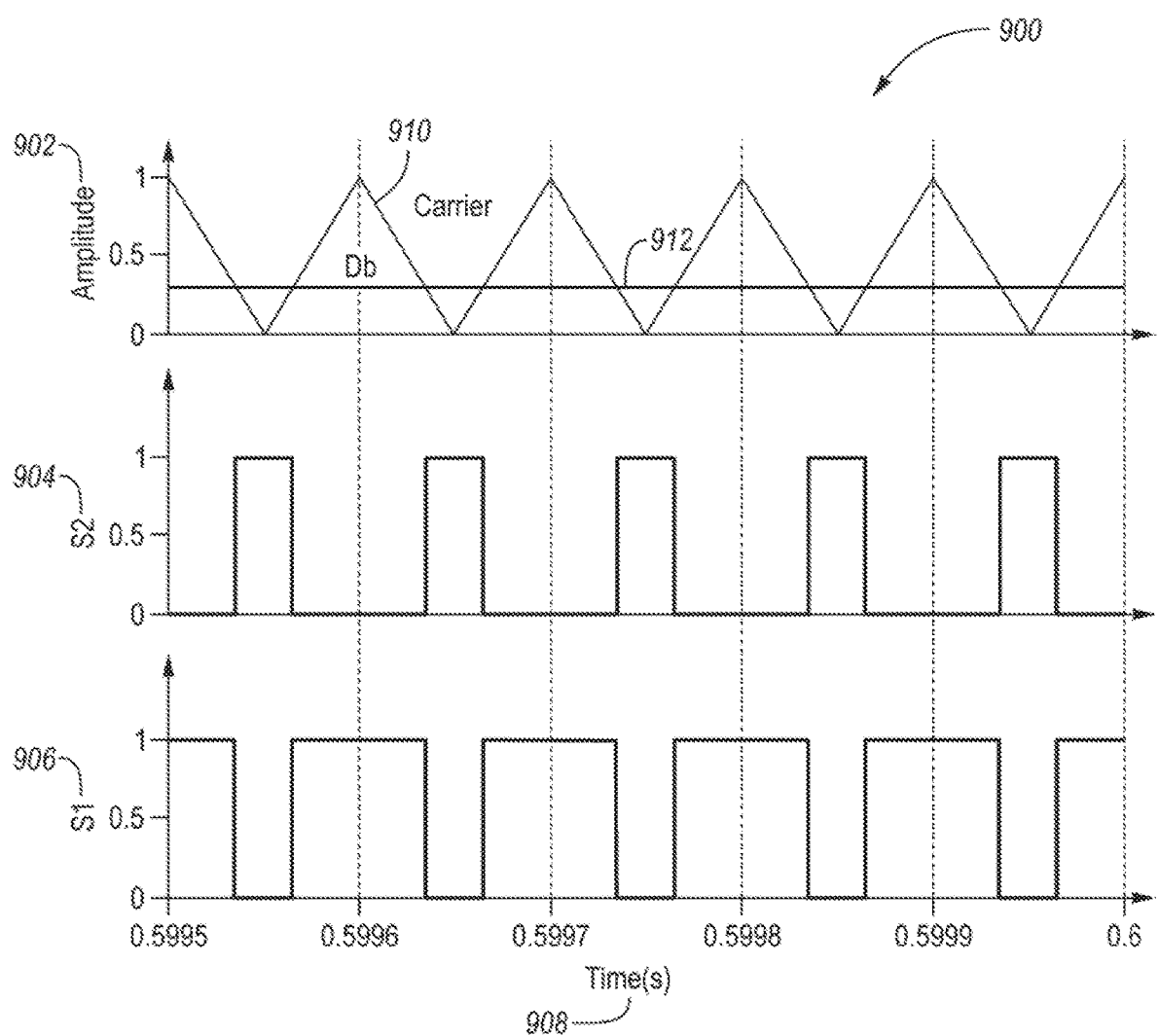
FIG. 9 is a graphical representation of a modulation method to control the dual electric machine powertrain of FIG. 5.

FIG. 9 illustrates a modulation waveform 900 to control switches (S1 516 and S2 518) of the buck-boost converter of FIG. 5. An amplitude 902, switch S2 gate signal 904, and switch S gate signal 906 are displayed with respect to time 908. The gate signal is such that S2 is on and S1 is off. Here, the duty cycle Db 912 compares with the carrier 910 to generate gate signals S1 and S2, which controls the converter to adjust DC bus voltages Vdc1 and Vdc2 in FIG. 5. The method in FIG. 9 may be applied to control the converters shown in FIGS. 7 and 8. In FIG. 7, the converter adjusts the DC bus voltage Vdc2. In FIG. 8, two converters adjust both of DC bus voltages Vdc1 and Vdc2, respectively.

Based on the modulation methods in FIGS. 6 and 9, each DC bus voltage in FIG. 5 may be individually controlled over a wide operating range. For example, during the low speed operation of the motor/generator, a low DC bus voltage of motor/generator inverter is available to reduce inverter power loss. And during high speed operation of the motor/generator, a high DC bus voltage can be achieved to provide the demanded motor/generator voltage. Here, the motor inverter (e.g., 506) is controlled to have a high DC bus voltage by adjusting $D_M$ and $D_b$ when the motor (e.g., 504) operates at a high speed, while the DC bus voltage of generator inverter (e.g., 510) is controlled to have a low level by adjusting $D_G$ and $D_b$ when the generator (e.g., 508) operates at a low speed. This allows a greater reduction in power losses of motor and generator inverters. A high modulation index and low DC bus voltage results in low total harmonic distortion (THD) of phase current in motor/generator. The two DC bus voltages in FIG. 5 may be represented by $$V_{dc1} = \frac{2D_b V_b}{1+D_G} \quad (1)$$

$$V_{dc2} = \frac{2D_b V_b}{1+D_M} \quad (2)$$

in which $V_{dc1}$ is the DC bus voltage of the generator capacitor 514, $V_{dc2}$ is the DC bus voltage of the motor capacitor 512, $-1<D_G<1$, $-1<D_M<1$, $0<=D_b<=1$, and $V_b$ is the voltage of battery 502.

Here, the sum of motor and generator powers are balanced by the battery power such that pM+pG+pB=0. In general, there are three operating modes, First is when the traction battery has no charging or discharging due to the motor and generator power being balanced (i.e., pM+pG=0, pB=0). Next is when the traction battery is charged and the sum of the motor and generator power is less than zero (i.e., total generating power is greater than the total propulsive power, pM+pG<0, pB>0). Third is when the traction battery is discharging when the sum of the motor and generator power is greater than zero (i.e., total generating power is less than total propulsive power, pM+pG>0, pB<0).

The system of FIG. 5 is such that each phase stator winding of the motor/generator has two current components. The first current component is a sinusoidal current that produces motor/generator torque and the second current component is a DC current component which is one-third of total DC current flowing through neutral point of motor/generator windings. This DC current component does not produce torque on motor/generator rotor, so it does not affect operation of motor/generator.

Three example operational modes are discussed to describe the E-drive system shown in FIG. 5. In a first operating mode, the generator 508 generates power in a high-speed mode while the motor 504 consumes power in a low speed mode, and the battery 502 is charged. In a second operating mode, the generator 508 generates power in a low speed mode while the motor 504 consumes power in a high-speed mode, and the battery 502 is discharged. And in a third operating mode, the generator 508 generates power in a high-speed mode while the motor 504 generates power in a low speed mode, and the battery 502 is charged.

FIG. 7 is a diagram of a dual electric machine powertrain that flows power from a battery 702 (e.g., traction battery) to a first electric machine 704 (motor) and motor inverter 706 and a second electric machine 708 (generator) and the generator inverter 710. The battery 702 is coupled with each electric machine's neutral terminal such that power flows to and from the battery 702 from the neutral terminals of the motor 704 and generator 708. The power passes through the inverters and bus storage capacitors. For example, on the motor side, power moves from the battery 702 to the motor 704 through switches $S_1$ 716 and $S_2$ 718, the motor inverter 706 and the motor DC bus capacitor 712, while on the generator side, power moves from the battery 702 to the generator 708 through the generator inverter 710 and the generator DC bus capacitor 714.

The powertrain of FIG. 7 further includes a first switch 716 coupled between the neutral terminal and the negative terminal of the battery 702, and a second switch 718 coupled between the neutral terminal of motor and the positive terminal of the battery 702. The first switch 716 may be a solid-state switch, such as a bipolar junction transistor (BJT), metal oxide semiconductor field effect transistor (MOSFET), or insulated gate bipolar junction transistor (IGBT). In FIG. 7, the first switch 716 is an IGBT and coupled such that the emitter is coupled with the negative terminal of the battery 702 and the collector is coupled with the neutral terminal of the motor. The second switch 718 may also be a solid-state switch, such as a bipolar junction transistor (BJT), metal oxide semiconductor field effect transistor (MOSFET), or insulated gate bipolar junction transistor (IGBT). In FIG. 7, the second switch 718 is an IGBT and coupled such that the emitter is coupled with the neutral terminal of the motor and the collector is coupled with the positive terminal of the battery 702.

The separate DC bus based E-drive system in a HEV allows for the motor and generator inverters to be separately controlled having their own DC buses. The separate DC busses allow each DC bus voltage to be independently varied to meet the voltage requirements of the electric machines operating at different speeds and possibly in different operating modes. For example, one electric machine may be generating power while the other may be consuming power This also allows the losses to be controlled, for example, a low DC bus voltage may be applied to provide a low motor/generator stator voltage at low speeds thus reducing the inverter power loss. The separate DC buses aid in a reduction of inverter power loss by overcoming issues of coupled DC bus shown in FIG. 4. For example, if the motor 704 runs at a high speed but the generator 708 operates at a low speed, the motor and generator inverters (706 and 710) will have two DC bus voltages, the motor DC bus is at a high DC bus voltage, and generator DC bus is at a low DC bus voltage to reduce power loss. A high modulation index and low DC bus voltage result in low total harmonic distortion (THD) of phase current in motor/generator.

As there is no VVC in the E-drive system, VVC-related drawbacks listed above may be avoided. In the E-drive system 700, the stator winding's neutral points of the generator 708 and motor 704 are coupled together to form two common neutral points, respectively. The battery 702 is coupled between the common neutral point of the generator and DC bus negative rail. The motor inverter 706 controls the motor's 704 operation and also controls the DC bus voltage Vdc2 at the motor bus capacitor 712 through working with the switches 716 and 718. Likewise, generator inverter 710 controls the generator's 708 operation and also controls the DC bus voltage Vdc1 at the generator bus capacitor 714. Both the motor 704 and generator 708 can operate in a propulsion and energy generating mode, the traction battery 702 can be in charging/discharging (or non-charging and non-discharging) mode. Here, the two inverters and switches 716 and 718 manage three sources (the motor 704, the generator 708, and the battery 702), all having bidirectional power flows, and two DC bus voltages Vdc1 at generator bus capacitor 714 and Vdc2 at motor bus capacitor 712 that may be independently controlled having different levels to meet the operational demands of the motor 704 and generator 708 operating at different speeds. The two DC bus voltages in FIG. 7 may be represented by $$V_{dc1} = \frac{2V_b}{1+D_G} \quad (3)$$

$$V_{dc2} = \frac{2D_b V_b}{1+D_M} \quad (4)$$

in which $V_{dc1}$ is the DC bus voltage of the generator capacitor 714, $V_{dc2}$, is the DC bus voltage of the motor capacitor 712, $-1<D_G<1$, $-1<D_M<1$, $0<=D_b<=1$, and $V_b$ is the voltage of battery 702.

FIG. 8 is a diagram of a dual electric machine powertrain that flows power from a battery 802 (e.g., traction battery) to a first electric machine 804 (motor) and motor inverter 806 and a second electric machine 808 (generator) and the generator inverter 810. The battery 802 is coupled with each electric machine's neutral terminal such that power flows to and from the battery 802 from the neutral terminals of the motor 804 and generator 808. The power passes through the inverters and bus storage capacitors. For example, on the motor side, power moves from the battery 802 to the motor 804 through switches 820 and 822, the motor inverter 806, and the motor DC bus capacitor 812, while on the generator side, power moves from the battery 802 to the generator 808 through switches 816 and 818, the generator inverter 810, and the generator DC bus capacitor 814.

The powertrain of FIG. 8 further includes a first switch 816 coupled between the neutral terminal of the generator 808 and the negative terminal of the battery 802, a second switch 818 coupled between the neutral terminal of generator 808 and the positive terminal of the battery 802. A third switch 820 is coupled between the neutral terminal of the motor 804 and the negative terminal of the battery 802, a fourth switch 822 is coupled between the neutral terminal of motor 804 and the positive terminal of the battery 802. The first, second, third, and fourth switches (816, 818, 820, and 822) may be solid-state switches, such as bipolar junction transistors (BJTs), metal oxide semiconductor field effect transistors (MOSFETs), insulated gate bipolar junction transistors (IGBTs), or a combination thereof.

In FIG. 8, the first switch 816 is an IGBT coupled such that the emitter is coupled with the negative terminal of the battery 802 and the collector is coupled with the neutral terminal of the generator 808. The second switch 818 is an IGBT coupled such that the emitter is coupled with the neutral terminal of the generator 808 and the collector is coupled with the positive terminal of the battery 802. The third switch 820 is an IGBT coupled such that the emitter is coupled with the negative terminal of the battery 802 and the collector is coupled with the neutral terminal of the motor 804. The fourth switch 822 is an IGBT coupled such that the emitter is coupled with the neutral terminal of the motor 804 and the collector is coupled with the positive terminal of the battery 802.

The separate DC bus based E-drive system in a HEV allows for the motor and generator inverters to be separately controlled having their own DC buses. The separate DC busses allow each DC bus voltage to be independently varied to meet the voltage requirements of the electric machines operating at different speeds and possibly in different operating modes. For example, one electric machine may be generating power while the other may be consuming power. This also allows the losses to be controlled, for example, a low DC bus voltage may be applied to provide a low motor/generator stator voltage at low speeds thus reducing the inverter power loss. The separate DC buses aid in a reduction of inverter power loss by overcoming issues of coupled DC bus shown in FIG. 4. For example, if the motor 804 runs at a high speed but the generator 808 operates at a low speed, the motor and generator inverters (806 and 810) will have two DC bus voltages, the motor DC bus is at a high DC bus voltage, and generator DC bus is at a low DC bus voltage to reduce power loss. A high modulation index and low DC bus voltage result in low total harmonic distortion (THD) of phase current in motor/generator.

As there is no VVC in the E-drive system, VVC-related drawbacks listed above may be avoided. In the E-drive system, the stator winding's neutral points of the generator 808 and motor 804 are coupled together to form two common neutral points, respectively. The battery 802 is coupled between the common neutral points and DC bus negative rail. The motor inverter 806 controls the motor's 804 operation and also controls the DC bus voltage Vdc2 at the motor bus capacitor 812 through working with switches 820 and 822. Likewise, generator inverter 810 controls the generator's 808 operation and also controls the DC bus voltage Vdc1 at the generator bus capacitor 814 through working with switches 816 and 818. Both the motor 804 and generator 808 can operate in a propulsion and energy generating mode, the traction battery 802 can be in charging/discharging (or non-charging and non-discharging) mode. Here, the two inverters and switches 816 and 818, 820 and 822 manage three sources (the motor 804, the generator 808, and the battery 802), all having bidirectional power flows, and two DC bus voltages Vdc1 at generator bus capacitor 814 and Vdc2 at motor bus capacitor 812 that may be independently controlled having different levels to meet the operational demands of the motor 804 and generator 808 operating at different speeds.

Two DC bus voltages of FIG. 5 are represented by equations (1) and (2) above. In which $-1<D_G<1$ and $-1<D_M<1$, $0<=D_b<=-1$, and $V_b$ is the battery voltage. Here each DC bus voltage is individually controlled in a wide range from zero to the designed boost voltage. Each DC bus voltage has two freedoms of control, i.e., $D_b$ and $D_G$ for the DC bus voltage of generator inverter, $D_b$ and $D_M$ for the DC bus voltage of motor inverter. For low speed operation of motor/generator, a low DC bus voltage of motor/generator inverter is available to reduce inverter power loss; for high speed operation, a high DC bus voltage is achieved to provide the demanded motor/generator voltage. For FIG. 7, the two DC bus voltages are represented by equations (3) and (4) DC bus voltage Vdc1 is controlled by generator inverter, its minimum value is battery voltage Vb. DC bus voltage Vdc2 is controlled by both of motor inverter and converter, its voltage range is from zero to desired boost voltage.

For FIG. 8, two DC bus voltages can be represented by equations (5) and (6) below.

$$V_{dc1} = \frac{2D_{b1}V_b}{1+D_G} \quad (5)$$

$$V_{dc2} = \frac{2D_{b2}V_b}{1+D_M} \quad (6)$$

In which $D_{b1}$ is the duty cycle of switch S2, $0<=D_{b1}<=1$; $D_{b2}$ is the duty cycle of switch $S_4$, $0<=D_{b2}<=1$. The two DC bus voltages are independently controlled because of independent $D_{b1}$ and $D_{b2}$, $D_G$ and $D_M$.

In the proposed E-drive system, the sum of motor and generator powers is balanced by battery power. Each phase stator winding of motor/generator carries two current components: (1) one is sinusoidal current to produce motor/generator torque; (2) another one is DC current component. This DC current component does not produce torque on motor/generator rotor, so it does not affect operation of motor/generator.

Figure 10A:
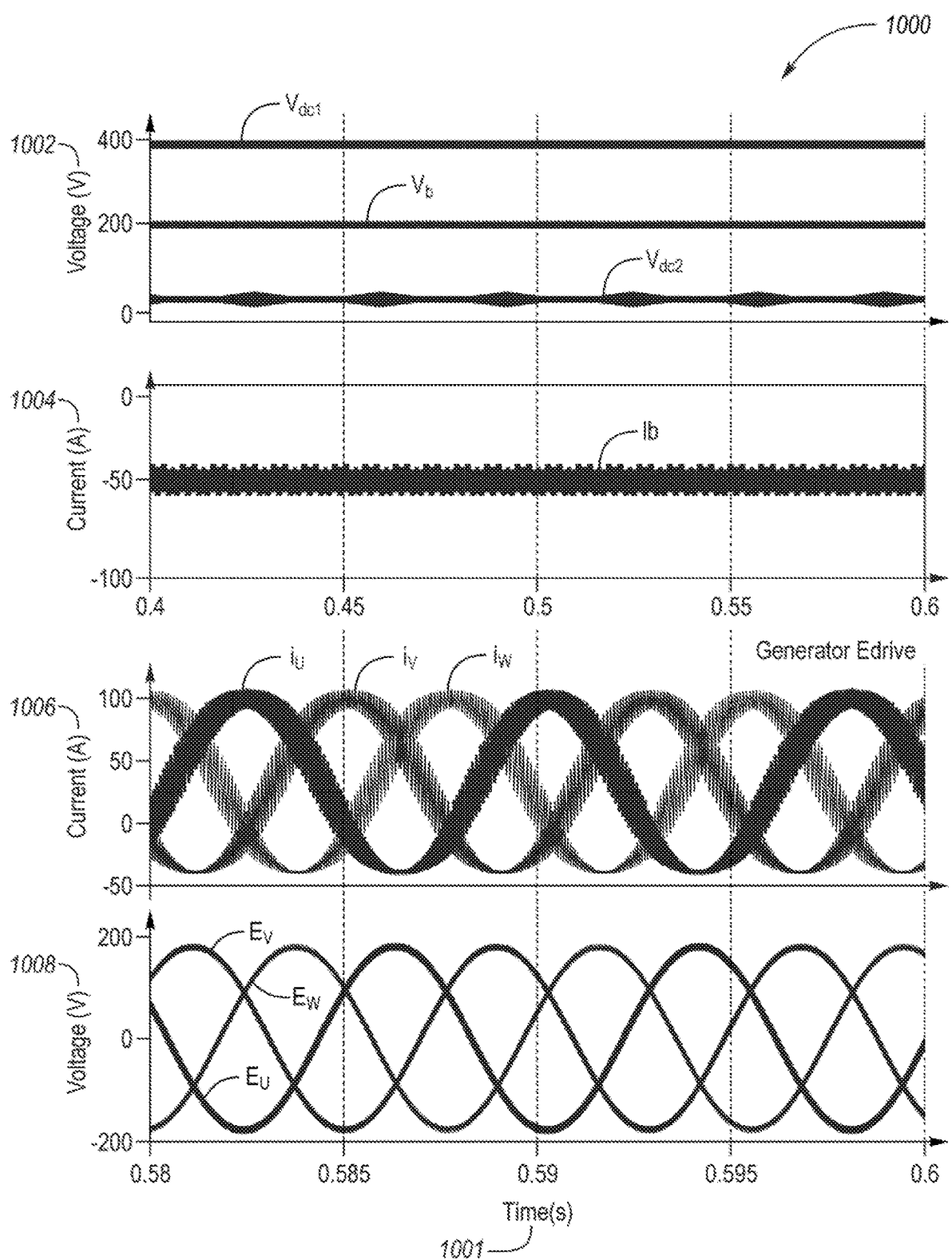
FIGS. 10A and 10B are graphical representations of system electrical characteristics with respect to time for an isolated dual bus hybrid vehicle drivetrain.
Figure 10B:
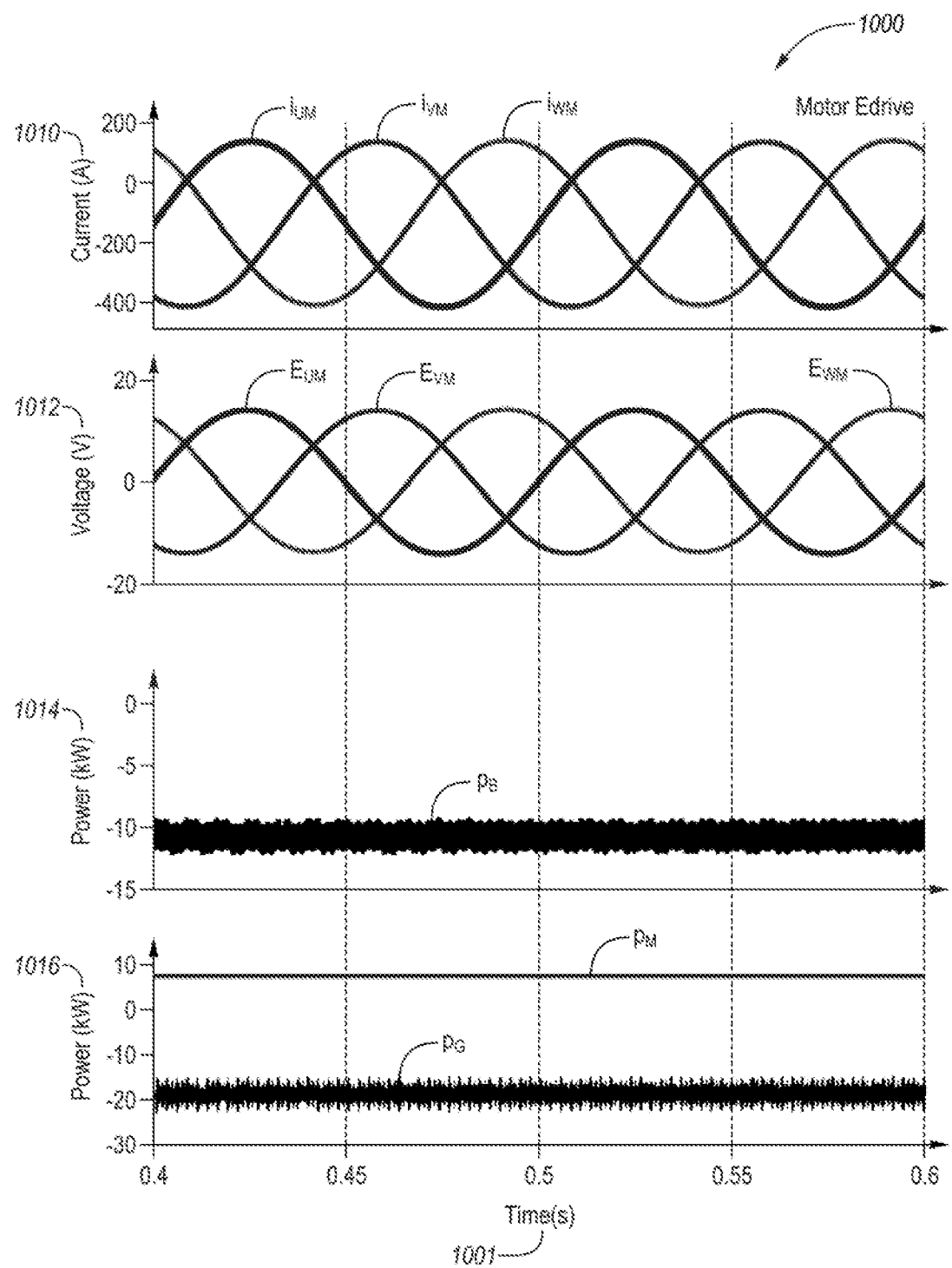

FIGS. 10A and 10B are graphical representations of system electrical characteristics with respect to time. FIG. 10A illustrates voltages 1002 (e.g., $V_{dc1}$, $V_{dc2}$, and $V_b$), battery current $I_b$ 1004, generator phase currents 1006 (e.g., $I_U$, $I_V$, and $I_W$), and generator phase back EMF voltage 1008 (e.g., $E_U$, $E_V$, and $E_W$) with respect to time, while FIG. 10B illustrates motor phase currents 1010 (e.g., $I_{UM}$, $I_{VM}$, and $I_{WM}$), motor phase back EMF voltage 1012 (e.g., $E_{UM}$, $E_{VM}$, and $E_{WM}$), battery power 1014, and electric machine power 1016 (e.g., $P_M$, and $P_G$) with respect to time.

In this first graphical illustration, Vb=205 V, Vdc2=35 V, and Vdc1=386 V. In this case, the high DC bus voltage Vdc1 of generator inverter is achieved to support the generator running in high speed mode, while the low DC bus voltage Vdc2 is fulfilled in motor inverter to support motor operating in low speed mode. As shown in FIGS. 10A and 10B, generator back-EMF (E_U, E_V, and E_W) is 127 V rms with 386-V DC bus voltage Vdc1. Motor back-EMF (E_UM, E_VM, and E_WM) is 10 V rms with 35-V DC bus voltage Vdc2 of motor inverter. The 50-A rms ac phase current makes generator produce 18.8-kW power pG in high speed, the motor has 200-A rms ac phase current and consumes 7.1-kW power pM in low speed. As a result, battery is charged with pB=10.7 kW and Vb=205 V. Generator stator winding carries 30-A DC current component to deliver the generating power (to neutral point) and motor stator winding carries −124-A DC current component to consume power (from neutral point). The power difference is charged into battery. Generator phase current has 180° phase shift when compared with its 127.2-Hz back-EMF; motor phase current is in phase with its 10-Hz back-EMF.

Figure 11A:
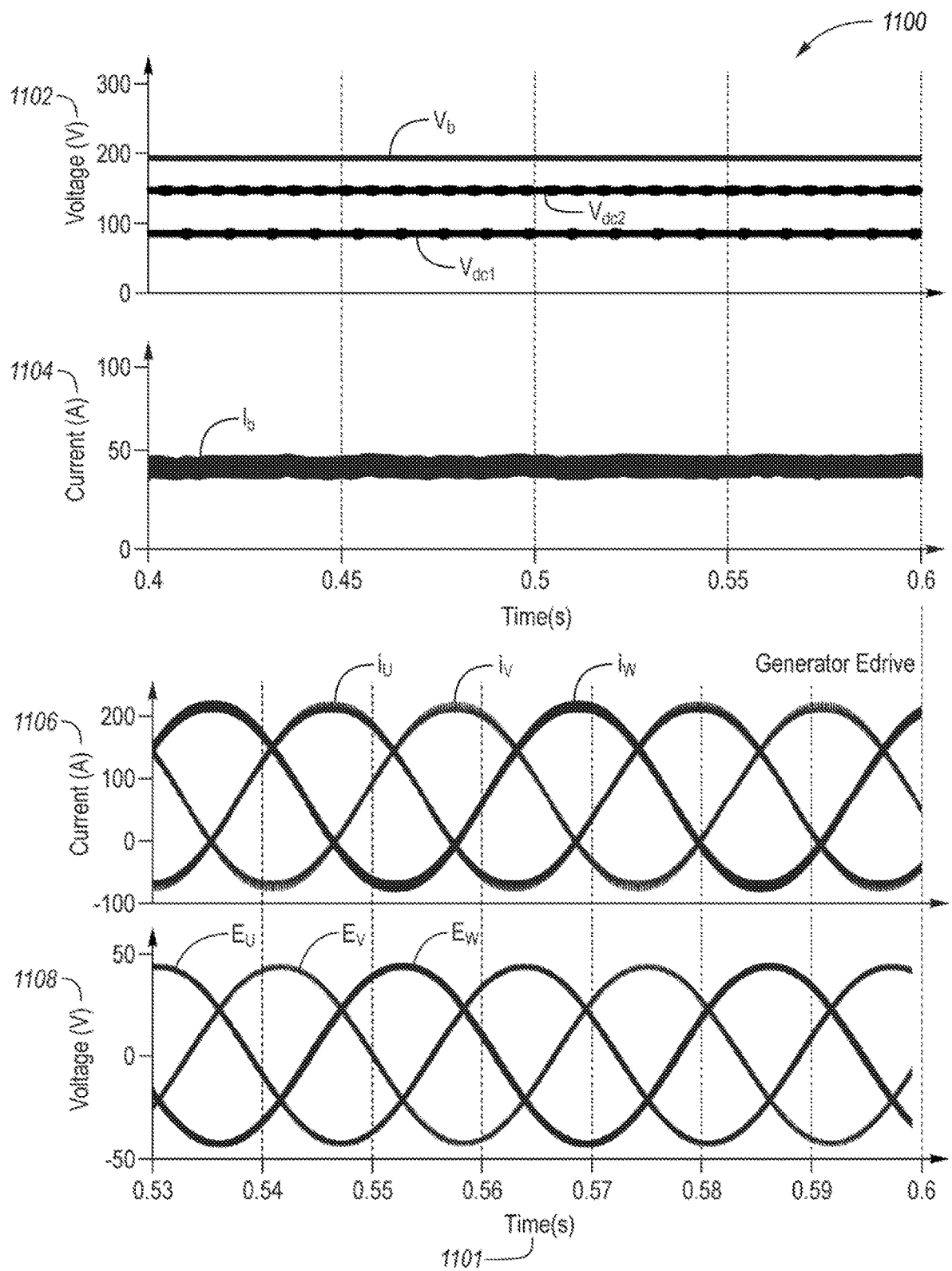
FIGS. 11A and 11B are graphical representations of system electrical characteristics with respect to time for an isolated dual bus hybrid vehicle drivetrain.
Figure 11B:
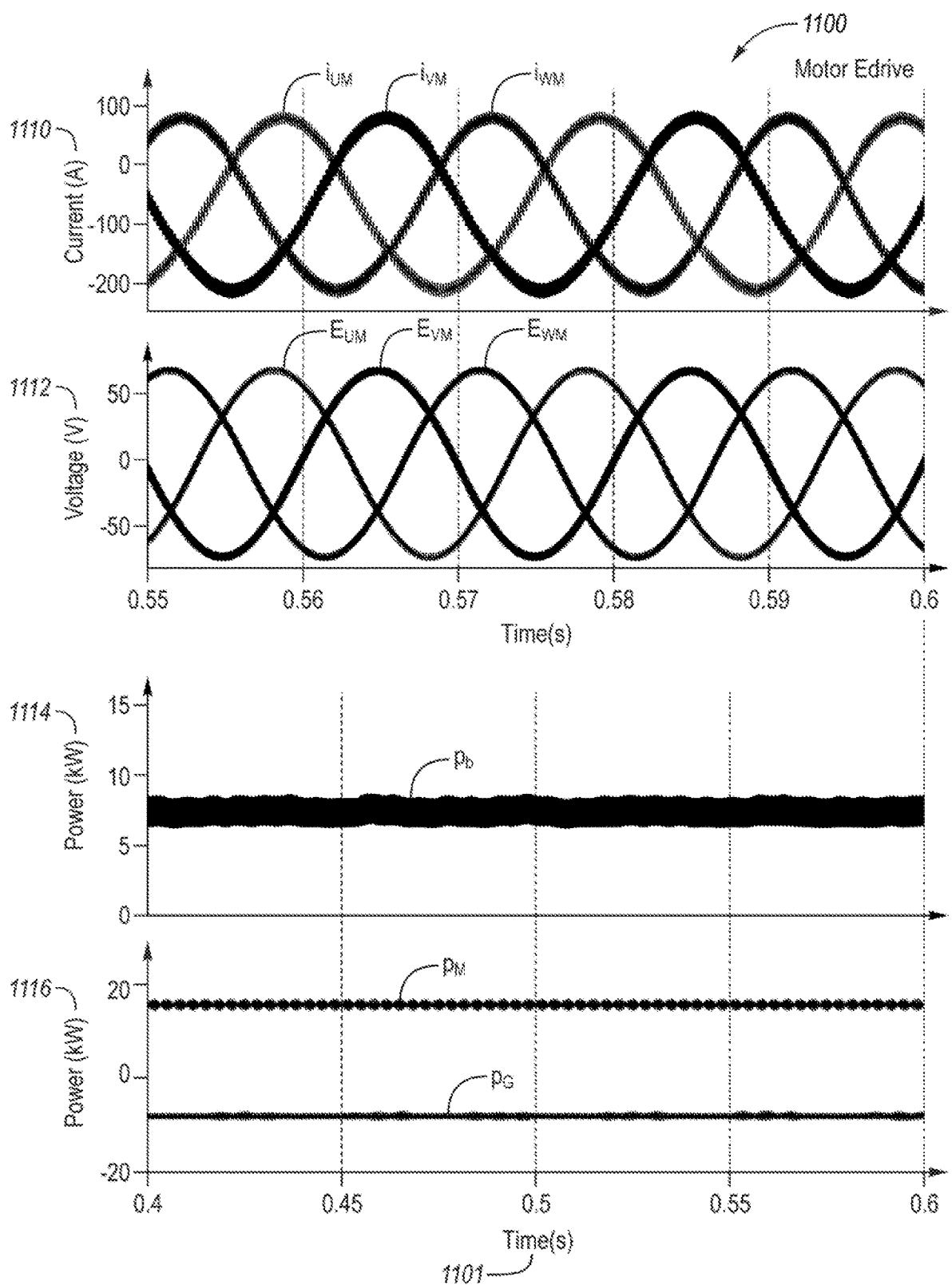

FIGS. 11A and 11B are graphical representations of system electrical characteristics with respect to time. FIG. 11A illustrates voltages 1102 (e.g., $V_{dc1}$, $V_{dc2}$, and $V_b$), battery current $I_b$ 1104, generator phase currents 1106 (e.g., $I_U$, $I_V$, and $I_W$), and generator phase back EMF voltage 1108 (e.g., $E_U$, $E_V$, and $E_W$) with respect to time, while FIG. 11B illustrates motor phase currents 1110 (e.g., $I_{UM}$, $I_{VM}$, and $I_{WM}$), motor phase back EMF voltage 1112 (e.g., $E_{UM}$, $E_{VM}$, and $E_{WM}$), battery power 1114, and electric machine power 1116 (e.g., $P_M$, and $P_G$) with respect to time.

In this second graphical illustration, Vb=196 V while Vdc2=146 V and Vdc1=84 V. In this case, the low DC bus voltage Vdc1 of generator inverter is achieved to support generator running in low speed; while the high DC bus voltage Vdc2 is fulfilled in motor inverter to support motor operating in high speed. As shown in FIGS. 11A and 11B, the generator back-EMF (E_U, E_V, and E_W) is 30 V rms with 84-V DC bus voltage Vdc1 of generator inverter. The motor back-EMF (E_UM, E_VM, and E_WM) is 50 V rms with 146-V DC bus voltage Vdc2 of motor inverter. The 100-A rms ac phase current makes generator produce 8.5-kW power pG, the motor has 102-A rms ac phase current and consumes 15.8-kW power pM in high speed. As a result, the battery is discharged at pB=7.6 kW and Vb=196 V. The generator stator winding carries 69-A DC current component to deliver the generating power (to neutral point) and motor stator winding carries −70.5-A DC current component to consume power (from neutral point). The power difference is compensated by battery discharging. Generator phase current has 1800 phase shift when compared with its 30-Hz back-EMF: motor phase current is in phase with its 50-Hz back-EMF.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain for a vehicle comprising:
   a Y-wound generator and Y-wound motor coupled via respective neutral terminals;
   a generator inverter coupled between the Y-wound generator and a generator bus;
   a motor inverter coupled between the Y-wound motor and a motor bus;
   a traction battery having first and second terminals each selectively coupled to the neutral terminals;
   a first switch coupled between the neutral terminals and a negative terminal of the traction battery; and
   a second switch coupled between the neutral terminals and a positive terminal of the traction battery, wherein the second terminal is further coupled to bus terminals of the generator and motor bus.

2. The powertrain of claim 1, wherein the bus terminals are negative bus terminals of the generator and motor bus.

3. The powertrain of claim 1, wherein the first and second switches are insulated gate bipolar junction transistors (IGBTs), a collector of the first switch is coupled with the neutral terminals, an emitter of the first switch is coupled with the negative terminal, a collector of the second switch is coupled with the positive terminal, and an emitter of the second switch is coupled with the neutral terminals.

4. The powertrain of claim 1 further comprising a controller configured to modulate switches of the generator inverter and the motor inverter such that voltage levels of the generator bus vary independently of the motor bus.

5. The powertrain of claim 4 further comprising a generator bus capacitor and a motor bus capacitor, wherein a generator bus voltage level is filtered by the generator bus capacitor and a motor bus voltage level is filtered by the motor bus capacitor.

6. The powertrain of claim 4, wherein the switches are insulated gate bipolar junction transistors (IGBTs) or metal oxide semiconductor field effect transistors (MOSFETs).

7. The powertrain of claim 1 further comprising a generator controller configured to modulate switches of the generator inverter and a motor controller configured to modulate switches of the motor inverter such that a generator phase frequency is independent of a motor phase frequency.

8. A vehicle powertrain comprising:
   a generator having a first neutral terminal;
   a motor having a second neutral terminal that is selectively coupled with the first neutral terminal;
   a traction battery having a first terminal that is selectively coupled to the first and second neutral terminal; and
   a first switch coupled between the first and second neutral terminals and a negative terminal of the traction battery; and
   a second switch coupled between the first and second neutral terminals and a positive terminal of the traction battery.

9. The vehicle powertrain of claim 8, wherein the first and second switches are insulated gate bipolar junction transistors (IGBTs), a collector of the first switch is coupled with the first and second neutral terminals, an emitter of the first switch is coupled with the negative terminal, a collector of the second switch is coupled with the positive terminal, and an emitter of the second switch is coupled with the first and second neutral terminals.

10. A powertrain for a vehicle comprising:
- a Y-wound generator and Y-wound motor coupled via respective neutral terminals;
- a generator inverter coupled between the Y-wound generator and a generator bus;
- a motor inverter coupled between the Y-wound motor and a motor bus;
- a traction battery having first and second terminals each selectively coupled to the neutral terminals; and
- a controller configured to modulate switches of the generator inverter and the motor inverter such that voltage levels of the generator bus vary independently of the motor bus, wherein the second terminal is further coupled to bus terminals of the generator and motor bus.

11. The powertrain of claim 10 further comprising a generator bus capacitor and a motor bus capacitor, wherein a generator bus voltage level is filtered by the generator bus capacitor and a motor bus voltage level is filtered by the motor bus capacitor.

12. The powertrain of claim 10, wherein the switches are insulated gate bipolar junction transistors (IGBTs) or metal oxide semiconductor field effect transistors (MOSFETs).

* * * * *